United States Patent
Kang et al.

(10) Patent No.: US 10,075,697 B2
(45) Date of Patent: Sep. 11, 2018

(54) DISPLAY APPARATUS AND IMAGE PROCESSING METHOD

(71) Applicant: SAMSUNG ELECTRONICS CO., LTD., Suwon-si (KR)

(72) Inventors: Jin-sung Kang, Suwon-si (KR); Seok-woo Yong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 534 days.

(21) Appl. No.: 14/478,047

(22) Filed: Sep. 5, 2014

(65) Prior Publication Data
US 2015/0077527 A1    Mar. 19, 2015

(30) Foreign Application Priority Data
Sep. 16, 2013    (KR) .................. 10-2013-0111305

(51) Int. Cl.
| | |
|---|---|
| H04N 7/12 | (2006.01) |
| H04N 9/47 | (2006.01) |
| H04N 13/04 | (2006.01) |
| H04N 5/44 | (2011.01) |
| H04N 13/02 | (2006.01) |
| H04N 13/00 | (2018.01) |
| H04N 5/262 | (2006.01) |
| H04N 5/265 | (2006.01) |
| H04N 21/431 | (2011.01) |

(52) U.S. Cl.
CPC ....... *H04N 13/0402* (2013.01); *H04N 5/4403* (2013.01); *H04N 13/0022* (2013.01); *H04N 13/026* (2013.01); *H04N 13/0456* (2013.01); *H04N 5/265* (2013.01); *H04N 5/2628* (2013.01); *H04N 21/4318* (2013.01)

(58) Field of Classification Search
None
See application file for complete search history.

(56) References Cited

U.S. PATENT DOCUMENTS

| | | | | |
|---|---|---|---|---|
| 4,682,217 | A * | 7/1987 | David | H04N 5/2628 345/419 |
| 6,674,484 | B1 * | 1/2004 | Boland | G06T 3/00 345/427 |
| 6,734,854 | B1 * | 5/2004 | Shimizu | G06T 15/405 345/422 |
| 2007/0003134 | A1 * | 1/2007 | Song | H04N 13/0022 382/154 |

(Continued)

FOREIGN PATENT DOCUMENTS

| | | |
|---|---|---|
| WO | 01/52528 A1 | 9/2001 |
| WO | 2011077058 A1 | 6/2011 |

OTHER PUBLICATIONS

Communication dated Feb. 12, 2015 issued by the European Patent Office in counterpart European Patent Application No. 14182946.5.

*Primary Examiner* — Talha M Nawaz
(74) *Attorney, Agent, or Firm* — Sughrue Mion, PLLC

(57) ABSTRACT

A method of processing an image in a display apparatus includes receiving an image from an external source, processing the received image by applying depth information to at least one pixel among pixels constituting the received image according to occurrence of a preset event, and displaying the processed image.

18 Claims, 8 Drawing Sheets

(56) References Cited

U.S. PATENT DOCUMENTS

| | | | |
|---|---|---|---|
| 2010/0135581 A1* | 6/2010 | Baik | H04N 13/026 382/195 |
| 2010/0165081 A1* | 7/2010 | Jung | H04N 13/0022 348/46 |
| 2011/0249099 A1* | 10/2011 | Vandewalle | G06T 7/0065 348/47 |
| 2012/0127267 A1* | 5/2012 | Zhang | G06T 7/0071 348/43 |
| 2012/0127270 A1* | 5/2012 | Zhang | G06T 7/0071 348/43 |
| 2012/0194516 A1* | 8/2012 | Newcombe | G06T 17/00 345/420 |
| 2012/0194517 A1* | 8/2012 | Izadi | G06T 17/00 345/420 |
| 2012/0306876 A1* | 12/2012 | Shotton | G06T 17/10 345/424 |
| 2013/0106837 A1* | 5/2013 | Mukherjee | H04N 13/0018 345/419 |
| 2013/0156294 A1* | 6/2013 | Wei | G06K 9/00691 382/154 |
| 2013/0156297 A1* | 6/2013 | Shotton | G06K 9/6255 382/159 |
| 2013/0162766 A1* | 6/2013 | Cohen | H04N 13/0022 348/43 |
| 2014/0232820 A1* | 8/2014 | Ha | H04N 13/026 348/43 |
| 2014/0294287 A1* | 10/2014 | Guo | G06K 9/00362 382/154 |
| 2014/0294289 A1* | 10/2014 | Nakatani | G06T 7/0075 382/154 |
| 2015/0033157 A1* | 1/2015 | Chang | H04N 5/23229 715/763 |

\* cited by examiner

DISPLAY APPARATUS AND IMAGE PROCESSING METHOD

CROSS-REFERENCE TO RELATED APPLICATIONS

This application claims priority from Korean Patent Application No. 10-2013-0111305, filed on Sep. 16, 2013, in the Korean Intellectual Property Office, the disclosure of which is incorporated herein by reference in its entirety.

BACKGROUND

1. Field

Apparatuses and methods consistent with exemplary embodiments relate to a display apparatus and an image processing method, and more particularly, to a display apparatus and an image processing method, for distorting and displaying a received image in real time.

2. Description of the Related Art

Upon receiving a two-dimensional (2D) image from an external source, a related art display apparatus processes the received 2D image at a predetermined level and displays the processed 2D image. In detail, the image received from the external source has an X coordinate and a Y coordinate per pixel. Thus, the display apparatus processes a received image based on coordinate information per pixel of the received image.

That is, the related art display apparatus simply processes a 2D image received from an external source in the form of 2D image but does not process the corresponding image to a three-dimensional (3D) image.

Thus, there is a need for a method of providing a 2D image received from an external source in the form of a 3D image as well as a 2D image in a display apparatus.

SUMMARY

One or more exemplary embodiments may overcome at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a display apparatus for providing an image received in a two-dimensional (2D) form as a stereoscopic image in a three-dimensional (3D) form.

According to an aspect of an exemplary embodiment, a method of processing an image in a display apparatus includes receiving an image from an external source, processing the received image by applying depth information to at least one pixel among pixels constituting the received image according to occurrence of a preset event, and displaying the processed image.

The pixels constituting the received image may include X coordinates and Y coordinates, respectively, and the processing may include adding at least one of different Z coordinates corresponding to the depth information to the at least one pixel among pixels constituting the received image.

The processing may include changing at least one from among the X coordinates, the Y coordinates, and the at least one added Z coordinate of the pixels constituting the received image.

The receiving may include receiving a broadcast image in real time from the external source, and the processing may include applying different depth information to the at least one pixel among the pixels constituting the received broadcast image in real time.

The preset event may include at least one from among an event of powering the display apparatus on or off, an event of changing the received image into another image, an event of converting a channel of the received image into another channel, and an event of receiving a request command for image distortion from a user.

The image processing may include applying the depth information to a subset of pixels fewer than the pixels of the received image.

The processing may include processing the received image in different forms based on a preset order, and the displaying may include sequentially displaying images processed in different forms.

The displaying may include simultaneously displaying the received image and the processed image.

The method may further include storing the depth information that is set corresponding to the preset event.

According to an aspect of another exemplary embodiment, a display apparatus includes a receiver configure to receive an image from an external source, an image processor configured to process the received image, a controller configured to control the image processor to process the received image by applying different depth information to at least one pixel among pixels constituting the received image according to occurrence of a preset event, and a display unit configured to display the processed image.

The pixels constituting the received image may include X coordinates and Y coordinates, respectively, and the controller may control the image processor to add at least one of different Z coordinates corresponding to the different depth information to the at least one pixel among pixels constituting the received image.

The controller may control the image processor to change at least one from among X coordinates, Y coordinates, and the at least one added Z coordinate of the pixels constituting the received image.

The receiver may receive a broadcast image in real time from the external source, and the controller may control the image processor to apply different depth information to the at least one pixel among the pixels constituting the received broadcast image in real time.

The preset event may include at least one from among an event of powering the display apparatus on or off, an event of converting the received image into another image, an event of changing a channel of the received image into another channel, and an event of receiving a request command for image distortion from a user.

The controller may apply the depth information to a subset of pixels fewer than the pixels of the received image.

The controller may control the image processor to process the received image in different forms according to a user command, and the display sequentially displays images processed in different forms.

The image processor may also process the image in a normal image output mode and the display may simultaneously display the image processed by applying the different depth information and the image processed in the normal image output mode.

The display apparatus may further include a storage configured to store the different depth information set corresponding to the preset event.

According to an aspect of still another exemplary embodiment, there is provided a non-transitory computer-readable recording medium having recorded thereon a program for executing the above method.

According to an aspect of still another exemplary embodiment, an apparatus for processing an image signal includes at least one processor operable to read and operate according to instructions within a computer program; and at least one memory operable to store at least portions of said computer program for access by said processor, wherein said program includes algorithms to cause said processor to implement: a controller configured to convert a received two dimensional (2D) image into a three dimensional (3D) image by applying depth information to at least one pixel among pixels constituting the received image according to a preset event occurring in the apparatus, wherein the depth information includes information of a depth of the converted 3D image set according to the preset event.

BRIEF DESCRIPTION OF THE DRAWING FIGURES

The above and/or other aspects will be more apparent by describing certain exemplary embodiments with reference to the accompanying drawings, in which.

DETAILED DESCRIPTION

Certain exemplary embodiments will now be described in greater detail with reference to the accompanying drawings.

Figure 1:
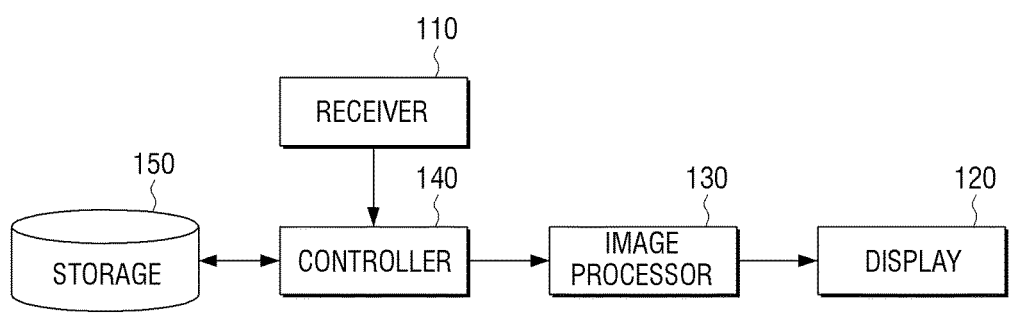
FIG. 1 is a block diagram of a display apparatus according to an exemplary embodiment.

FIG. 1 is a block diagram of a display apparatus according to an exemplary embodiment.

As illustrated in FIG. 1, a display apparatus includes a receiver 110, a display 120, an image processor 130, and a controller 140.

The receiver 110 receives an image from an external source. In detail, the receiver 110 may receive a broadcast image in real time from an external source through at least one of, for example, a public television (TV), a satellite, and a cable. However, exemplary embodiments are not limited thereto. The display apparatus may include a communication unit (not shown) and receive a content image via wired and/or wireless communication network from an external server through the communication unit. In some exemplary embodiments, the communication unit may include a wireless communication module that may be connected to an external network to perform communication according to a wireless communication protocol or connected to a mobile communication network to perform communication according to various mobile communication standards when the display apparatus receives the broadcast image from the external server using a wireless communication method. The wireless communication protocol may include, for example, wireless fidelity (WiFi), institute of electrical and electronics engineers (IEEE), etc. and the mobile communication standards may include, for example, 3rd generation (3G), 3rd generation partnership project (3GPP), long term evolution (LTE), etc. Upon receiving a content image from an external server using a wired communication method, the communication unit may perform communication in a wired local area network (LAN) manner to receive the content image from the external server.

The display 120 displays the broadcast image received from the external source through the receiver 110 or the content image received through the communication unit. In detail, upon receiving the image through the receiver 110 or the communication unit, the image processor 130 processes the received image in the form of an image to be output to the display 120. Thus, the display 120 may display the image that is image processed by the image processor 130. The display 120 may be embodied as, for example, a touch screen for detecting a touch, a cathode ray tube (CRT), a liquid crystal display (LCD), a thin film transistor liquid crystal display (TFT-LCD), a plasma display panel (PDP), a flexible display, a head mounted display (HMD), or the like.

The controller 140 controls the image processor 130 to apply different depth information to pixels constituting a corresponding image and to process a received image to stereoscopically distort the received image according to occurrence of a preset event. Thus, the image processor 130 may stereoscopically distort the received image based on the depth information applied to the pixels constituting the received image and the display 120 may display the processed image that is distorted by the image processor 130. Here, the received image may be a 2D image including pixels having X coordinates and Y coordinates. Thus, the controller 140 may control the image processor 130 to add Z coordinates to X coordinates and Y coordinates of the pixels constituting the received image and to convert the received image into the distorted image in response to the preset event. In addition, the controller 140 may control the image processor 130 to change at least one of X coordinates, Y coordinates, and Z coordinates of the pixels and to distort the received image to another form of an image when Z coordinates are applied to the respective pixels constituting the received image.

In detail, the controller 140 may add Z coordinates to X coordinates and Y coordinates of the pixels constituting the received image based on depth information stored in a storage 150 or change at least one of X coordinates, Y coordinates, and Z coordinates of the pixels when the Z coordinates are applied to the pixels.

The storage 150 may store the depth information that is set to distort an image in different ways in response to the preset event. The depth information may be preset and stored by a manufacturer or set and stored by a user. Here, the preset event may be at least one of an event of, for example, powering the display apparatus on or off, an event of converting the received image into another image, an event of changing a channel of the received image into another channel, and an event of inputting a request command for image distortion from a user.

Thus, the storage 150 may set and store different depth information to distort an image in different ways based on preset events. For example, the depth information may be set to distort the received image in a first form in a case of the event of powering the display apparatus on or off and to distort the received image in a second form in a case of the event of converting the received image into another image. In addition, the depth information may be set to distort the received image in a third form in a case of the event of changing a channel of the received image into another channel and to distort the received image in a fourth form in a case of the event of inputting a request command for image distorting from a user.

Thus, the controller 140 may control the image processor 130 to acquire depth information according to occurrence of an event and to distort the received based on the acquired depth information, when the corresponding event occurs. According to an exemplary embodiment, the controller 140 may control the image processor 130 to apply corresponding depth information to pixels constituting the received image based on the depth information set according to occurrence of a first event and to distort an entire portion of the received image when the first event occurs. Thus, the image processor 130 may distort the entire portion of the received image based on the depth information set according to the occurrence of the first event.

According to another exemplary embodiment, when a second event occurs, the controller 140 may control the image processor 130 to apply the corresponding depth information to some pixels among the pixels of the received image based on the depth information set according to the occurrence of the second event and to partially distort the received image. Thus, the image processor 130 may distort a portion of the received image based on the depth information set according to the occurrence of the second event.

According to another exemplary embodiment, when a third event occurs, the controller 140 may control the image processor 130 to distort the received image in different forms based on the depth information set according to the occurrence of the third event. Thus, the image processor 130 may distort the received information in different forms based on the depth information set according to the occurrence of the third event and the display 120 may display the image that is distorted in different forms by the image processor 130.

Here, the image processor 130 may be integrated into the controller 140 or provided as a separate element. The controller may be, for example, a central processing unit (CPU) and the storage 150 may be a memory.

An algorithm for distorting an image based on coordinates of pixels constituting a 2D image is known and thus is not described in detail here.

Hereinafter, an operation of distorting a received image in different forms according to a preset event and displaying the image in the display apparatus will be described in more detail.

Figure 2:
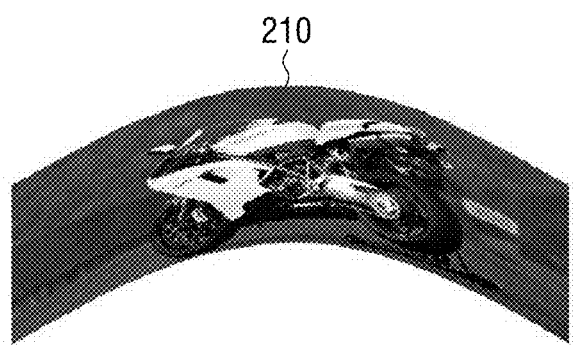
FIG. 2 illustrates an example of displaying an image that is distorted in a first form according to occurrence of a first event in a display apparatus according to an exemplary embodiment.

FIG. 2 illustrates an example of displaying an image that is distorted in a first form according to occurrence of a first event by a display apparatus according to an exemplary embodiment.

As illustrated in FIG. 2, the storage 150 may set and store depth information for distorting a received image according to the occurrence of the first event. Here, the first event may be an event of powering the display apparatus on or off. When the first event of powering the display apparatus on or off occurs, the controller 140 controls the image processor 130 to distort an image, received via a preset channel at time of powering the display apparatus on or off, in a first form based on the depth information set corresponding to the first event.

For example, when an image is received via a channel prior to powering the display apparatus on, the display apparatus may set and store channel information about the channel. For example, when an image is received through a first channel prior to powering the display apparatus on, the display apparatus may preset and store the channel information about the first channel. When the channel information about the first channel is preset and stored in the display apparatus and a power-on command of the display apparatus is input to the display apparatus according to a user command, the receiver 110 of the display apparatus may receive the image through the first channel based on the pre-stored channel information. Upon receiving the image through the first channel, the controller 140 controls the image processor 130 to distort the received image in the first form based on the depth information set to the first event of powering the display apparatus on.

Thus, the image processor 130 distorts the received image in the first form based on the depth information set according to the occurrence of the first event. For example, as illustrated in FIG. 2, the image processor 130 may perform image processing for distorting the received image such that an intermediate portion thereof is bent. Thus, the display 120 may display a distorted image 210 obtained via image processing of distorting the received image to bend an intermediate thereof by the image processor 130. The display 120 may temporarily or continuously display the corresponding distorted image 210.

According to an exemplary embodiment, the controller 140 may control the image processor 130 to perform image processing for distorting, in a first form, the image received by the receiver 110 in real time until a user command for outputting a normal mode image is input. Thus, the image processor 130 may perform image processing for distorting, in the first form, the image received by the receiver 110 in real time. Thus, the display 120 may display the distorted image 210 obtained via image processing performed by the image processor 130 until the user command for outputting the normal mode image is input.

According to another exemplary embodiment, the controller 140 may control the image processor 130 to perform image processing for distorting, in the first form, the image received by the receiver 110 in real time. For example, the controller 140 may control the image processor 130 to perform image processing for distorting, in the first form, in real time on a frame-unit image that is initially received from an external source through the receiver 110 when the display apparatus is powered on. Thus, the image processor 130 may perform image processing for distorting, in the first form, the frame-unit image that is initially received among images received through the receiver 110 in real time. In an exemplary embodiment, when the user command for outputting the normal mode image is input, the image processor 130 may perform image processing on the received frame-unit image to correspond to the normal mode image. Thus, the display 120 may temporarily display the distorted image 210 that is image processed by the image processor 130 and then display the image that is processed to the normal mode image.

Figure 3:
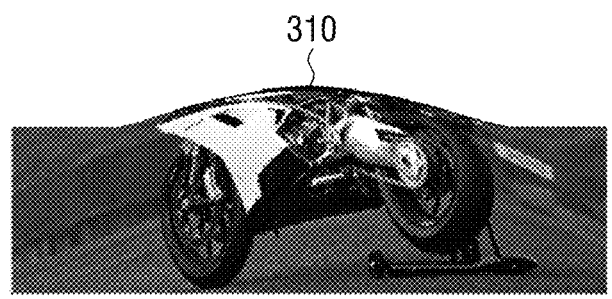
FIG. 3 illustrates an example of displaying an image that is distorted in a second form according to occurrence of a second event in a display apparatus according to an exemplary embodiment.

FIG. 3 illustrates an example of displaying an image that is distorted in a second form according to occurrence of a second event in a display apparatus according to an exemplary embodiment.

As illustrated in FIG. 3, the storage 150 may set and store depth information for distorting a received image according to the occurrence of the second event. Here, the second event may be an event of converting the received image into another image. For example, the second event may be an event of converting the image received from a first channel through the receiver 110 from a first image to a second image.

When the second event of converting the image received through the same channel from the first image to the second image occurs, the controller 140 controls the image processor 130 to distort, in the second form, the second image based on depth information set corresponding to the second event at the time of receiving the second image through the corresponding channel.

As in the aforementioned example, the image received through the first channel may be converted to the second image from the first image. When the image received through the first channel is converted to the second image from the first image, the controller 140 controls the image processor 130 to distort, in the second form, the second image based on the depth information set corresponding to the second event, that is, converting the received image to the second image from the first event through the corresponding channel.

Thus, the image processor 130 distorts the received image in the second form based on the depth information set according to the occurrence of the second event. For example, as illustrated in FIG. 3, the image processor 130 may perform image processing for partially distorting the second image based on the depth information set corresponding to the second event. Thus, the display 120 may display a distorted image 310 obtained by partially distorting the second image by the image processor 130. The display 120 for displaying the distorted image 310 may temporarily or continuously display the corresponding distorted image 310.

According to an exemplary embodiment, the controller 140 may control the image processor 130 to perform image processing for distorting, in the second form, the second image received by the receiver 110 in real time until a user command for outputting a normal mode image is input. Thus, the image processor 130 may perform image processing for distorting, in the second form, the second image received by the receiver 110 in real time. Thus, the display 120 may display the distorted image 310 obtained via image processing performed by the image processor 130 until the user command for outputting the normal mode image is input.

According to another exemplary embodiment, the controller 140 may control the image processor 130 to perform image processing for distorting the second image received by the receiver 110 in real time, in the second form according to a preset order. For example, the controller 140 may control the image processor 130 to perform image processing for distorting, in the second form, a frame-unit image of the second image initially received at time when the image received through the first channel is converted from the first image to the second image. Thus, the image processor 130 may perform image processing for distorting, in the second form, a frame-unit image that is initially received among second images received through the receiver 110 in real time. In an exemplary embodiment, when the user command for outputting the normal mode image is input, the image processor 130 may perform image processing on a subsequent frame of the second image corresponding to the normal mode image. Thus, the display 120 may temporarily display the distorted image 310 via image processing by the image processor 130 and then display the image processed to the normal mode image.

Figure 4:
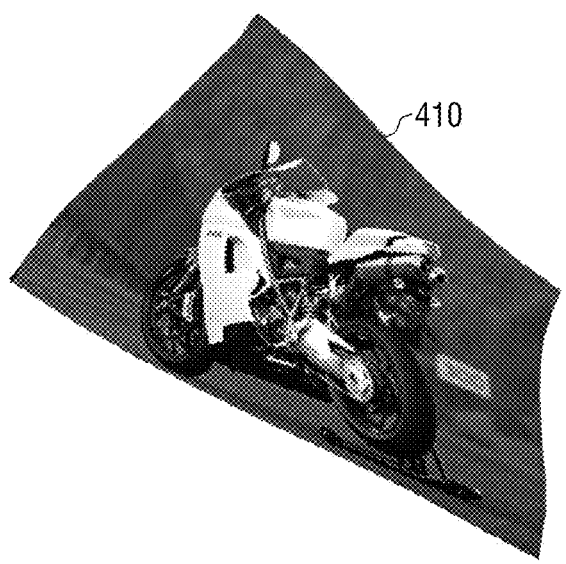
FIG. 4 illustrates an example of displaying an image that is distorted in a third form according to occurrence of a third event in a display apparatus according to an exemplary embodiment.

FIG. 4 illustrates an example of displaying an image that is distorted in a third form according to occurrence of a third event in a display apparatus according to an exemplary embodiment.

As illustrated in FIG. 4, the storage 150 may set and store depth information for distorting a received image according to the occurrence of the third event. Here, the third event may be an event of changing a channel of the received image into another channel. For example, the third event may refer to an event of changing a first channel to a second channel according to a channel changing command when an image is received from the first channel through the receiver 110.

When the third event corresponding to channel change occurs, the controller 140 controls the image processor 130 to distort a corresponding image, in the third form, at time when the image is received through the channel corresponding to the channel changing command based on the depth information set corresponding to the third event.

As described above, when the channel change command to change a channel to the second channel from the first channel is input, the controller 140 controls the image processor 130 to distort, in the third form, the image received from the second channel based on the depth information set corresponding to the third event of changing the first channel to the second channel.

Thus, the image processor 130 distorts the image received from the second channel in the third form based on the depth information set corresponding to the third event. For example, as illustrated in FIG. 4, the image processor 130 may perform image processing for rotating and moving the image received from the second channel based on the depth information set corresponding to the third event. Thus, the display 120 may display a distorted image 410 obtained by performing image processing for rotating and moving the image via the image processor 130. The display 120 for displaying the distorted image 410 may temporarily or continuously display the distorted image 410.

According to an exemplary embodiment, the controller 140 may control the image processor 130 to perform image processing for distorting, in the third form, the image received in real time through the channel changed according to the channel changing command until a user command for outputting a normal mode image is input. Thus, the image processor 130 may perform image processing for distorting, in the third form, the image received in real time through the corresponding channel. Thus, the display 120 may display the distorted image 410 obtained via image processing performed by the image processor 130 until the user command for outputting the normal mode image is input.

According to another exemplary embodiment, the controller 140 may control the image processor 130 to perform image processing for distorting the received image in real time through the channel changed according to the channel changing command, in the third form according to a preset condition. For example, the controller 140 may control the image processor 130 to perform image processing for distorting a frame-unit image of a fourth image initially received in the third form at time when the image received through the first channel is changed from a third image to a fourth image. Thus, the image processor 130 may perform image processing for distorting, in the third form, a frame-unit image that is initially received among third images received in real time through the second channel. In an exemplary embodiment, when the user command for outputting the normal mode image is input, the image processor 130 may perform image processing on a subsequent frame of the fourth image to corresponding to the normal mode image. Thus, the display 120 may temporarily display the distorted image 410 via image processing by the image processor 130 and then display the image processed to the normal mode image.

Figure 5:
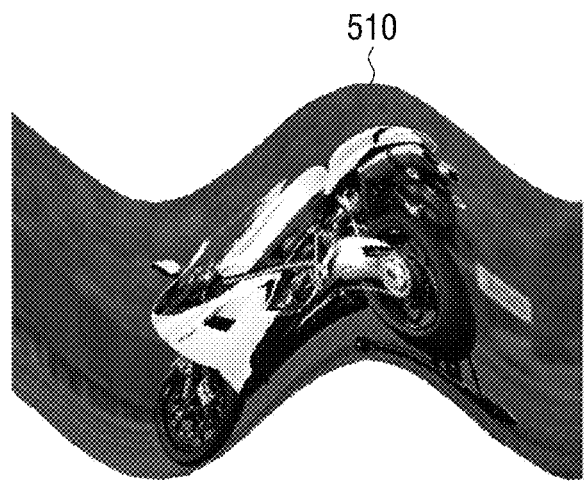
FIG. 5 illustrates an example of displaying an image that is distorted in a fourth form according to occurrence of a fourth event in a display apparatus according to an exemplary embodiment.

FIG. 5 illustrates an example of displaying an image that is distorted in a fourth form according to occurrence of a fourth event in a display apparatus according to an exemplary embodiment.

The depth information for distorting an image in the first to third forms according to occurrence of the first to third event, which has been described with reference to FIGS. 2 to 4, may be set by a manufacturer and stored in the storage 150. However, the depth information for distorting the image in a fourth form according to occurrence of a fourth event may be set by a user. Here, the fourth event may be an event of inputting a request command for image distortion from the user.

In detail, the user may request setting of depth information for distorting an image in a form desired by the user. When the request command is input, an adjustment command for at least one of X coordinates, Y coordinates, and Z coordinates may be input from the user. In this case, the controller 140 controls the image processor 130 to generate depth information corresponding to the adjustment command corresponding to at least one of X coordinates, Y coordinates, and Z coordinates, which is input from the user and to distort a currently received image based on the generated depth information. In this case, the controller 140 may store the depth information to be generated corresponding to the adjustment command for at least one of X coordinates, Y coordinates, and Z coordinates, which is input from the user, in the storage 150.

The image processor 130 distorts the image received through the receiver 110 based on the depth information generated corresponding to the adjustment command input from the user. For example, as illustrated in FIG. 5, the image processor 130 may perform image processing for distorting the image received through the receiver 110 in a wave form based on the depth information corresponding to the adjustment command input from the user. Thus, the display 120 may display an image 510 obtained by distorting the received image in a wave form through the image processor 130.

However, exemplary embodiments are not limited thereto. In an alternative embodiment, the display 120 may display the distorted image 510 and a normal mode image together based on the depth information generated corresponding to the adjustment command input from the user.

Figure 6:
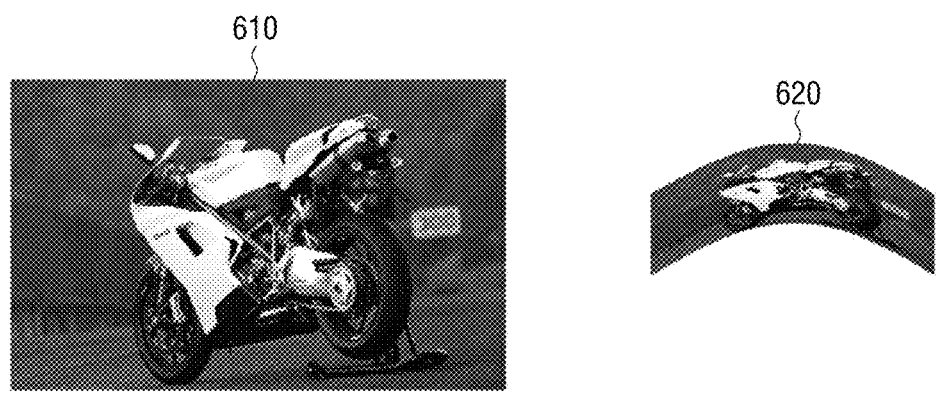
FIG. 6 illustrates an example in which a display apparatus displays a normal mode image and a distorted image according to an exemplary embodiment.

FIG. 6 illustrates an example in which a display apparatus displays a normal mode image and a distorted image according to an exemplary embodiment.

As described with reference to FIG. 5, when a request command for image distortion including an adjustment command for at least one of X coordinates, Y coordinates, and Z coordinate is input to the controller 140 from a user, the controller 140 may generate depth information in response to the adjustment command input by the user. When the depth information is generated, the image processor 130 distorts an image received by the receiver 110 based on the depth information generated in response to the adjustment command input by the user. Thus, the display 120 may display a distorted image 620 that is image processed by the image processor 130.

In an exemplary embodiment, according to the request command for image distortion input from the user, the controller 140 may control the image processor 130 to image process the image received by the receiver 110 to a distorted image and a normal mode image. Thus, as described above, the image processor 130 may image process the image received by the receiver 110 to the distorted image 620 based on the generated depth information in response to the adjustment command input from the user and also image process the image received by the receiver 110 to a normal mode image 610.

Thus, the display 120 may display the normal mode image 610 of the image received by the receiver 110 on a first portion of a screen and display the distorted image 620 of the image on a second portion of the screen.

However, exemplary embodiments are not limited thereto. As described with reference to FIGS. 2 to 4, the controller 140 may control the image processor 130 to distort the received image in the first to third forms according to occurrence of the first to third events, respectively. When a simultaneous mode display request is input to the controller 140 from the user, the controller 140 may control the image processor 130 to image process the received image in the first to third forms to a distorted image and a normal mode image according to occurrence of the first to third events, respectively. Thus, the image processor 130 may image process the received image to a normal mode image while distorting the corresponding image in the first to third forms based on the set depth information in response to the first to third events, respectively. Thus, the display 120 may display the normal mode image and the distorted image distorted in the first to third forms according to occurrence of the first to third events, respectively. For example, the normal mode image and the distorted image may be displayed simultaneously.

Figure 7:
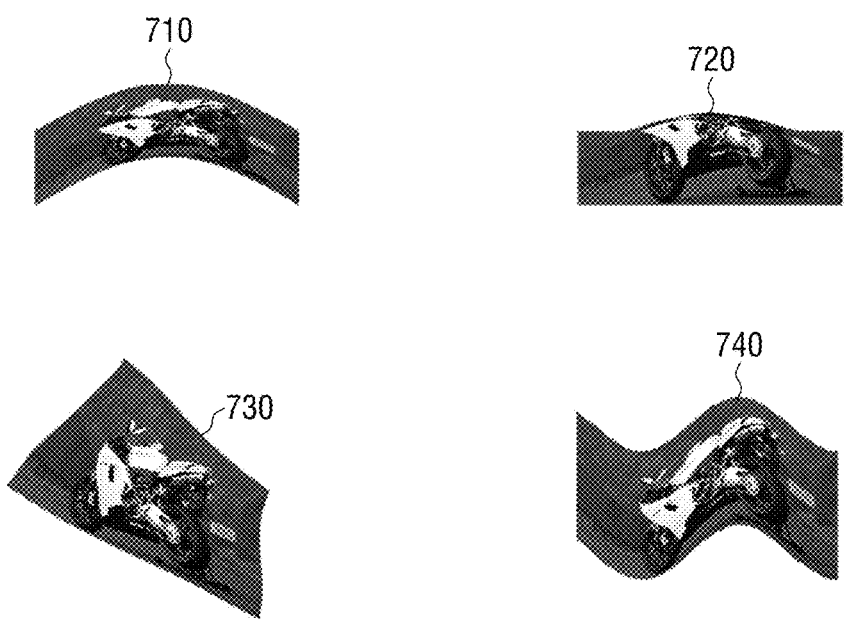
FIG. 7 illustrates an example of displaying an image that is distorted in first to fourth forms by a display apparatus according to an exemplary embodiment.

FIG. 7 illustrates an example of displaying an image that is distorted in first to fourth forms in a display apparatus according to an exemplary embodiment.

As described above, the storage 150 may store depth information set for distorting a received image in the first to fourth forms according to the occurrence of first to fourth events, respectively. When the depth information for distorting the received image in the first to fourth forms is stored, the user may request that an image displayed on a screen is distorted in the first to fourth forms and displayed in a panorama form.

According to a panorama display request input from the user, the controller 140 controls the image processor 130 to distort the received image in the first to fourth forms according to a preset order. Here, the preset order may be an order at which the received image is distorted and displayed in the first to fourth forms. According the preset order, the image processor 130 may distort the image received by the receiver 110 in the first to fourth forms based on the depth information set for distorting the image in the first to fourth forms. Here, the image distorted in the first form may be a distorted image obtained via image processing of distorting the received image to bend at an intermediate thereof, the image distorted in the second form may be a distorted image obtained by partially distorting the received image, the image distorted in the third form may be a distorted image obtained by rotating and moving the received image, and the image distorted in the fourth form may be a distorted image obtained by image processing of distorting the received image in a wave form. However, it should be noted that exemplary embodiments are not limited thereto.

In an exemplary embodiment, the preset order may be set such that the received image is distorted and displayed in an order from the first to fourth forms. For example, as illustrated in FIG. 7, the image processor 130 distorts an image received by the receiver 110 based on the depth information set for distorting the received image in the first form. Next, the image processor 130 distorts the image received by the receiver 110 based on the depth information set for distorting the received image in the second form. Next, the image processor 130 distorts the image, received by the receiver 110 based on the depth information set for distorting the received image in the third form. Next, the image processor 130 distorts the image received by the receiver 110 based on the depth information set for distorting the received image in the fourth form.

Accordingly, the display 120 may display a first form distorted image 710, a second form distorted image 720, a third form distorted image 730, and a fourth form distorted image 740, which are image processed by the image processor 130, in a panorama form.

Thus far, the components of a display apparatus according to exemplary embodiments have been described in detail. Hereinafter, an image processing method of a display apparatus according to an exemplary embodiment will be described in detail.

Figure 8:
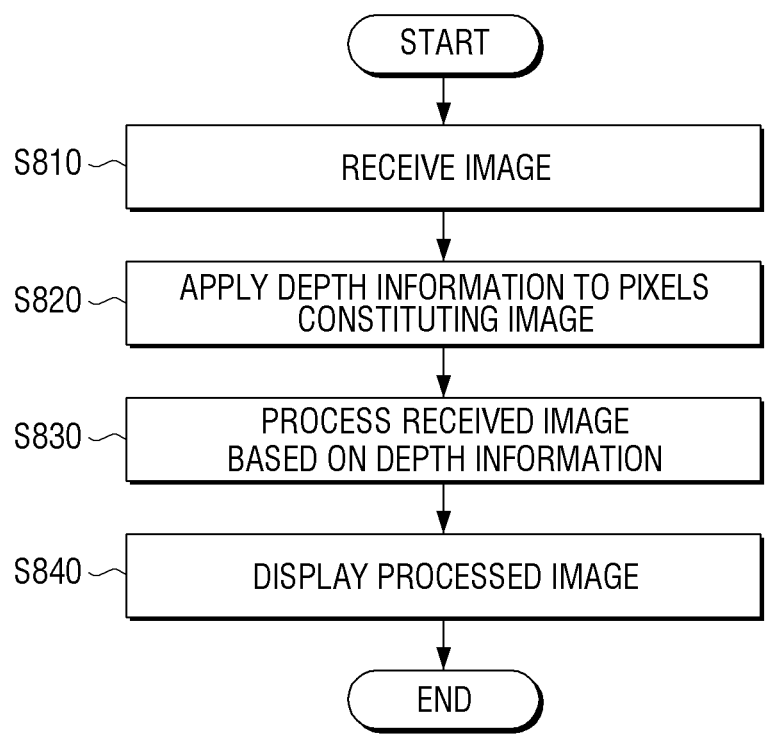
FIG. 8 is a flowchart of an image processing method of a display apparatus according to an exemplary embodiment.

FIG. 8 is a flowchart of an image processing method of a display apparatus according to an exemplary embodiment.

As illustrated in FIG. 8, a display apparatus receives an image from an external source (S810). In detail, the display apparatus may receive a broadcast image in real time from the external source through at least one of, for example, a public TV, a satellite, and a cable.

The display apparatus that receives the broadcast image in real time from the external source applies different depth information to pixels constituting a received image to stereoscopically distort the received image according to occurrence of a preset event (S820). Next, the display apparatus image processes and displays the received image based on the depth information applied to the pixels constituting the received image (S830 and S840).

Here, the received image may be a 2D image including pixels having X coordinates and Y coordinates. Thus, the display apparatus may add Z coordinates to X coordinates and Y coordinates of the pixels constituting the received image and convert the received image to a distorted image. In addition, the display apparatus may change at least one of X coordinates, Y coordinates, and Z coordinates of the pixels and to distort the received image to another form of an image when Z coordinates are applied to the respective pixels constituting the received image.

In detail, the display apparatus may store the depth information that is set to distort an image in different forms corresponding to the preset event. The depth information may be preset and stored by a manufacturer or set and stored by a user. Here, the preset event may be at least one of, for example, an event of powering the display apparatus on or off, an event of converting the received image into another image, an event of changing a channel of the received image into another channel, and an event of inputting a request command for image distortion from a user.

Thus, the depth information may be set to distort the received image in a first form in a case of the event of powering the display apparatus on or off and to distort the received image in a second form in a case of the event of converting the received image into another image. In addition, the depth information may be set to distort the received image in a third form in a case of the event of changing a channel of the received image into another channel and to distort the received image in a fourth form in a case of the event of inputting a request command for image distorting from a user.

Thus, the display apparatus may acquire depth information according to occurrence of an event and distort and display the received based on the acquired depth information when the corresponding event occurs.

According to an exemplary embodiment, the display apparatus may apply corresponding depth information to pixels constituting the received image based on the depth information set according to occurrence of a first event and distort an entire portion of the received image when the first event occurs. For example, the display apparatus may display the distorted image shown in FIG. 2.

According to another exemplary embodiment, when a second event occurs, the display apparatus may apply the corresponding depth information to some pixels among the pixels of the received image based on the depth information set according to the occurrence of the second event and partially distorts the received image. For example, the display apparatus may display the distorted image shown in FIG. 3.

According to another exemplary embodiment, when a third event occurs, the display apparatus may distort the received image in different forms according to a preset order and sequentially display the images distorted in different forms. For example, the display apparatus may display the distorted images shown in FIG. 7. A method of sequentially displaying the images distorted in different forms according to an exemplary embodiment has been described in detail with reference to FIG. 8 and thus, will not be described here.

Accordingly, a display apparatus according to exemplary embodiments may distort a received image in real time and display the distorted image according to occurrence to a preset event.

An image processing methods according to exemplary embodiments may be embodied in at least one computer program for executing the image processing methods.

The program for performing the image processing methods according to exemplary embodiments may be stored in various types of record media. For example, a code for performing the image processing methods according to exemplary embodiments may be stored in various types of record medium readable by a terminal such as a random access memory (RAM), a flash memory, a read only memory (ROM), erasable programmable ROM (EPROM), an electronically erasable and programmable ROM (EEPROM), a register, a hard disk, a removable disk, a memory card, a universal serial bus (USB) memory, and a compact disc ROM (CD-ROM).

As described above, according to various exemplary embodiments, a display apparatus may provide a 3D image based on a 2D image received from an external source. Thus, a user may have a new viewing experience through the 3D image.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of processing an image in a display apparatus, the method comprising:
   storing, in a storage, a plurality of different depth information that respectively correspond to a first event and a second event;
   receiving an image from an external source;
   processing the received image into a first form by applying first depth information of the plurality of different depth information corresponding to the first event to at least one pixel among pixels constituting the received image based on an occurrence of the first event;
   processing the received image into a second form different than the first form by applying second depth information of the plurality of different depth information corresponding to the second event to the at least one pixel among the pixels constituting the received image based on an occurrence of the second event; and
   sequentially displaying the processed image in the first form and the processed image in the second form.

2. The method as claimed in claim 1, wherein:
   the pixels constituting the received image comprise X coordinates and Y coordinates, respectively; and
   the processing the received image into the first form and the processing the received image into the first form comprise adding at least one of different Z coordinates corresponding to the plurality of different depth information to the at least one pixel among the pixels constituting the received image.

3. The method as claimed in claim 2, wherein the processing the received image into the first form and the processing the received image into the first form comprise changing at least one from among the X coordinates, the Y coordinates, and the added at least one Z coordinate of the pixels constituting the received image.

4. The method as claimed in claim 1, wherein:
   the receiving comprises receiving a broadcast image in real time from the external source; and
   the processing the received image into the first form and the processing the received image into the first form comprise applying the first depth information and the second depth information to the at least one pixel among the pixels constituting the received broadcast image in real time.

5. The method as claimed in claim 1, wherein at least one of the first event and the second event comprises at least one from among an event of powering the display apparatus on or off, an event of converting the received image into another image, an event of changing a channel of the received image into another channel, and an event of receiving a request command for image distortion from a user.

6. The method as claimed in claim 1, wherein the processing the received image into the first form and the processing the received image into the first form comprise applying the first depth information and the second depth information to a subset of pixels fewer than the pixels of the received image.

7. The method as claimed in claim 1, wherein:
   the processing the received image into the first form and the processing the received image into the first form comprise applying the first depth information corresponding to the first event and the second depth information corresponding to the second event in a preset order.

8. The method as claimed in claim 1, wherein the displaying comprises simultaneously displaying the received image and the processed image.

9. A display apparatus comprising:
   a storage configured to store a plurality of different depth information that respectively correspond to a first event and a second event;
   a receiver configured to receive an image from an external source;
   an image processor configured to process the received image;
   a controller configured to control the image processor to process the received image into a first form by applying first depth information of the plurality of different depth information corresponding to the first event to at least one pixel among pixels constituting the received image based on an occurrence of the first event, and process the received image into a second form different than the first form by applying second depth information of the plurality of different depth information corresponding to the second event to the at least one pixel among the pixels constituting the received image based on an occurrence of the second event; and
   a display configured to sequentially display the processed image in the first form and the Processed image in the second form.

10. The display apparatus as claimed in claim 9, wherein:
    the pixels constituting the received image comprise X coordinates and Y coordinates, respectively; and
    the controller controls the image processor to add at least one of different Z coordinates corresponding to the plurality of different depth information to the at least one pixel among the pixels constituting the received image.

11. The display apparatus as claimed in claim 10, wherein the controller controls the image processor to change at least one from among the X coordinates, the Y coordinates, and the added at least one Z coordinate of the pixels constituting the received image.

12. The display apparatus as claimed in claim 9, wherein:
    the receiver receives a broadcast image in real time from the external source; and
    the controller controls the image processor to apply the first depth information and the second depth information to the at least one pixel among the pixels constituting the received broadcast image in real time.

13. The display apparatus as claimed in claim 9, wherein at least one of the first event and the second event comprises at least one from among an event of powering the display apparatus on or off, an event of converting the received image into another image, an event of changing a channel of the received image into another channel, and an event of receiving a request command for image distortion from a user.

14. The display apparatus as claimed in claim 9, wherein the controller applies the first depth information and the second depth information to a subset of pixels fewer than the pixels of the received image.

15. The display apparatus as claimed in claim 9, wherein:
    the controller controls the image processor to process the received image to be in the first form and the second form according to a user command; and
    the display sequentially displays images processed to be in the first form and the second form.

16. The display apparatus as claimed in claim 9, wherein the image processor also processes the image in a normal image output mode and the display simultaneously displays the image processed by applying the first depth information and the second depth information and the image processed in the normal image output mode.

17. A non-transitory computer-readable recording medium having recorded thereon a program for executing the method of claim 1.

18. An apparatus for processing an image signal comprising:
- at least one processor operable to read and operate according to instructions within a computer program; and
- at least one memory operable to store at least portions of the computer program for access by the at least one processor,
- wherein the at least one memory is configured to store a plurality of different depth information that respectively correspond to a first event and a second event,
- wherein the computer program includes algorithms to cause the at least one processor to implement:
- a controller configured to convert a received two dimensional (2D) image into a three dimensional (3D) image corresponding a first form by applying first depth information of the plurality of different depth information corresponding to the first event to at least one pixel among pixels constituting the received 2D image based on an occurrence of the first event, and convert the received 2D image into a 3D image corresponding a second form different than the first form by applying second depth information of the plurality of different depth information corresponding to the second event to the at least one pixel among the pixels constituting the received 2D image based on an occurrence of the second event, and
- wherein at least one of the first depth information and the second depth information includes information of a depth of the converted 3D image set according to the event.

* * * * *